(12) United States Patent
Costa et al.

(10) Patent No.: US 9,482,111 B2
(45) Date of Patent: Nov. 1, 2016

(54) FAN CONTAINMENT CASE WITH THERMALLY CONFORMING LINER

(71) Applicant: United Technologies Corporation, Hartford, CT (US)

(72) Inventors: Mark W. Costa, Storrs, CT (US); Thomas J. Robertson, Jr., Glastonbury, CT (US); Darin S. Lussier, Berlin, CT (US)

(73) Assignee: United Technologies Corporation, Farmington, CT (US)

( * ) Notice: Subject to any disclaimer, the term of this patent is extended or adjusted under 35 U.S.C. 154(b) by 1184 days.

(21) Appl. No.: 13/714,821

(22) Filed: Dec. 14, 2012

(65) Prior Publication Data

US 2014/0286748 A1    Sep. 25, 2014

(51) Int. Cl.
   *F01D 21/00* (2006.01)
   *F01D 21/04* (2006.01)

(52) U.S. Cl.
   CPC ....... *F01D 21/045* (2013.01); *F05D 2300/121* (2013.01); *F05D 2300/431* (2013.01); *F05D 2300/501* (2013.01); *F05D 2300/502* (2013.01); *Y02T 50/672* (2013.01)

(58) Field of Classification Search
   CPC .................................................. F01D 21/045
   USPC .......................................................... 415/9
   See application file for complete search history.

(56) References Cited

U.S. PATENT DOCUMENTS

| | | | |
|---|---|---|---|
| 4,149,824 A * | 4/1979 | Adamson | .............. F01D 21/045 415/9 |
| 4,534,698 A * | 8/1985 | Tomich | .............. F01D 21/045 415/9 |
| 5,160,248 A | 11/1992 | Clarke | |
| 5,516,258 A * | 5/1996 | Newton | ................ F01D 21/045 415/9 |
| 6,053,696 A | 4/2000 | Roberts | |
| 6,394,746 B1 | 5/2002 | Sathianathan et al. | |
| 6,402,464 B1 | 6/2002 | Chiu et al. | |
| 6,575,694 B1 | 6/2003 | Thompson et al. | |
| 6,957,949 B2 | 10/2005 | Hyde et al. | |
| 6,979,172 B1 | 12/2005 | Mackenzie | |
| 7,076,942 B2 | 7/2006 | Schreiber | |
| 7,937,943 B2 | 5/2011 | Cao | |

(Continued)

FOREIGN PATENT DOCUMENTS

| | | |
|---|---|---|
| EP | 1336739 A2 | 8/2003 |
| EP | 2487335 A2 | 8/2012 |
| EP | 2495400 A2 | 9/2012 |

OTHER PUBLICATIONS

International Preliminary Report on Patentability for International Application No. PCT/US2012/074024 mailed on Jun. 25, 2015.

(Continued)

*Primary Examiner* — Richard Edgar
(74) *Attorney, Agent, or Firm* — Carlson, Gaskey & Olds, P.C.

(57) ABSTRACT

A fan section of a gas turbine engine includes a fan containment case assembly includes an outer case of an aluminum alloy. The outer case extends circumferentially around an axial centerline. A thermally conforming liner assembly is located inwardly of the outer case. The thermally conforming liner assembly includes a circumferential liner of an aluminum alloy. A ballistic liner is located between the outer case and the thermally conforming liner assembly.

20 Claims, 2 Drawing Sheets

(56) References Cited

U.S. PATENT DOCUMENTS

| | | |
|---|---|---|
| 8,176,748 B2 | 5/2012 | Cao |
| 2003/0156940 A1 | 8/2003 | Czachor et al. |
| 2004/0146393 A1 | 7/2004 | Evans et al. |
| 2005/0089391 A1 | 4/2005 | Stretton |
| 2006/0093847 A1 | 5/2006 | Hornick et al. |
| 2008/0069688 A1* | 3/2008 | Harper ................ F01D 21/045 415/196 |
| 2010/0089062 A1 | 4/2010 | Cao |
| 2010/0091459 A1 | 4/2010 | Zhang |
| 2010/0307157 A1 | 12/2010 | Bilton et al. |
| 2010/0307158 A1 | 12/2010 | Bilton et al. |
| 2010/0319884 A1 | 12/2010 | Okuyama et al. |
| 2012/0082541 A1 | 4/2012 | Macchia et al. |
| 2012/0099975 A1 | 4/2012 | Robertson, Jr. et al. |
| 2012/0148392 A1 | 6/2012 | Lussier et al. |
| 2012/0207583 A1 | 8/2012 | Voleti et al. |

OTHER PUBLICATIONS

International Search Report & Written Opinion for International Application No. PCT/US2013/074024 mailed Mar. 25, 2014.
European Search Report for EP Application No. 13862300.4 dated Jan. 15, 2016.
Search Report and Written Opinion for Singapore Application No. 11201504178S dated Feb. 23, 2016.

* cited by examiner

FAN CONTAINMENT CASE WITH THERMALLY CONFORMING LINER

BACKGROUND OF THE INVENTION

A gas turbine engine including a hard wall fan containment case made from aluminum alloy benefits from the use of an inner ballistic liner. The inner ballistic liner is made from a material with high shear strength, such as an aromatic fabric impregnated with an organic polymer. The inner ballistic liner mitigates an initial shear threat from a liberated fan blade, allowing the fan containment case to have a thinner wall and an optimized design weight. This configuration can be used when the fan blade is also made of an aluminum alloy. At high altitudes, fan temperatures are very cold, causing materials, such as aluminum alloy, with a high coefficient of expansion to contract. However, these temperatures have a minimal effect on materials with a low coefficient of expansion, such as an aramid fabric.

SUMMARY OF THE INVENTION

A fan section of a gas turbine engine according to an exemplary embodiment of this disclosure, among other possible things, includes a fan containment case assembly including an outer case of an aluminum alloy. The outer case extends circumferentially around an axial centerline. A thermally conforming liner assembly is located inwardly of the outer case. The thermally conforming liner assembly includes a circumferential liner of an aluminum alloy. A ballistic liner is located between the outer case and the thermally conforming liner assembly.

In a further embodiment of any of the foregoing fan sections, the ballistic liner is made of an aramid fiber.

In a further embodiment of any of the foregoing fan sections, includes a plurality of fan blades located radially about the axial centerline within the fan containment case assembly.

In a further embodiment of any of the foregoing fan sections, the ballistic liner circumferentially surrounds the plurality of fan blades and is located in a fan blade region of the fan containment case assembly.

In a further embodiment of any of the foregoing fan sections, the circumferential liner includes a first section located forward of the fan blade region, a second section located in the fan blade region, and a third section located aft of the fan blade region, and the thermally conforming liner assembly includes a forward acoustic liner located inwardly of and adjacent to the first section of the circumferential liner, a face sheet located inwardly of the forward acoustic liner, a honeycomb core located inwardly of and adjacent to the second section of the circumferential liner, and an inboard liner located inwardly of the honeycomb core.

In a further embodiment of any of the foregoing fan sections, the forward acoustic liner, the face sheet, the honeycomb core, and the inboard liner are made of an aluminum alloy.

In a further embodiment of any of the foregoing fan sections, includes an abradable rub material located inwardly of the second section of the circumferential liner in the fan blade region.

In a further embodiment of any of the foregoing fan sections, the abradable rub material is an aramid honeycomb filled with epoxy.

In a further embodiment of any of the foregoing fan sections, an elastomeric material bonds the ballistic liner to the outer case.

In a further embodiment of any of the foregoing fan sections, the elastomeric material is polysulfide or silicone rubber.

In a further embodiment of any of the foregoing fan sections, the outer case is attached to the thermally conforming liner assembly with a plurality of fasteners.

A gas turbine according to an exemplary embodiment of this disclosure, among other possible things, includes a fan containment case assembly including an outer case of an aluminum alloy. The outer case extends circumferentially around an axial centerline. A thermally conforming liner assembly is located inwardly of the outer case. The thermally conforming liner assembly includes a circumferential liner of an aluminum alloy. A ballistic liner is located between the outer case and the thermally conforming liner assembly. The ballistic liner is made of an aramid fiber and is located in a fan blade region of the fan containment case assembly. A plurality of fan blades is located radially about the axial centerline within the fan containment case assembly. The ballistic liner circumferentially surrounds the plurality of fan blades. The plurality of fan blades is located in the fan blade region of the fan containment case assembly. The ballistic liner circumferentially surrounds the plurality of fan blades.

In a further embodiment of any of the foregoing gas turbine engines, the circumferential liner includes a first section located forward of the fan blade region, a second section located in the fan blade region, and a third section located aft of the fan blade region. The thermally conforming liner assembly includes a forward acoustic liner located inwardly of and adjacent to the first section of the circumferential liner. A face sheet is located inwardly of the forward acoustic liner. A honeycomb core is located inwardly of and adjacent to the second section of the circumferential liner. An inboard liner is located inwardly of the honeycomb core.

In a further embodiment of any of the foregoing gas turbine engines, the forward acoustic liner, the face sheet, the honeycomb core, and the inboard liner are made of an aluminum alloy.

In a further embodiment of any of the foregoing gas turbine engines, includes an abradable rub material located inwardly of the second section of the circumferential liner in the fan blade region.

In a further embodiment of any of the foregoing gas turbine engines, the abradable rub material is an aramid honeycomb filled with epoxy.

In a further embodiment of any of the foregoing gas turbine engines, an elastomeric material bonds the ballistic liner to the outer case.

In a further embodiment of any of the foregoing gas turbine engines, the elastomeric material is polysulfide or silicone rubber.

In a further embodiment of any of the foregoing gas turbine engines, the outer case is attached to the thermally conforming liner assembly with a plurality of fasteners.

These and other features of the present invention can be best understood from the following specification and drawings, the following of which is a brief description.

DETAILED DESCRIPTION OF THE PREFERRED EMBODIMENTS

Figure 1:
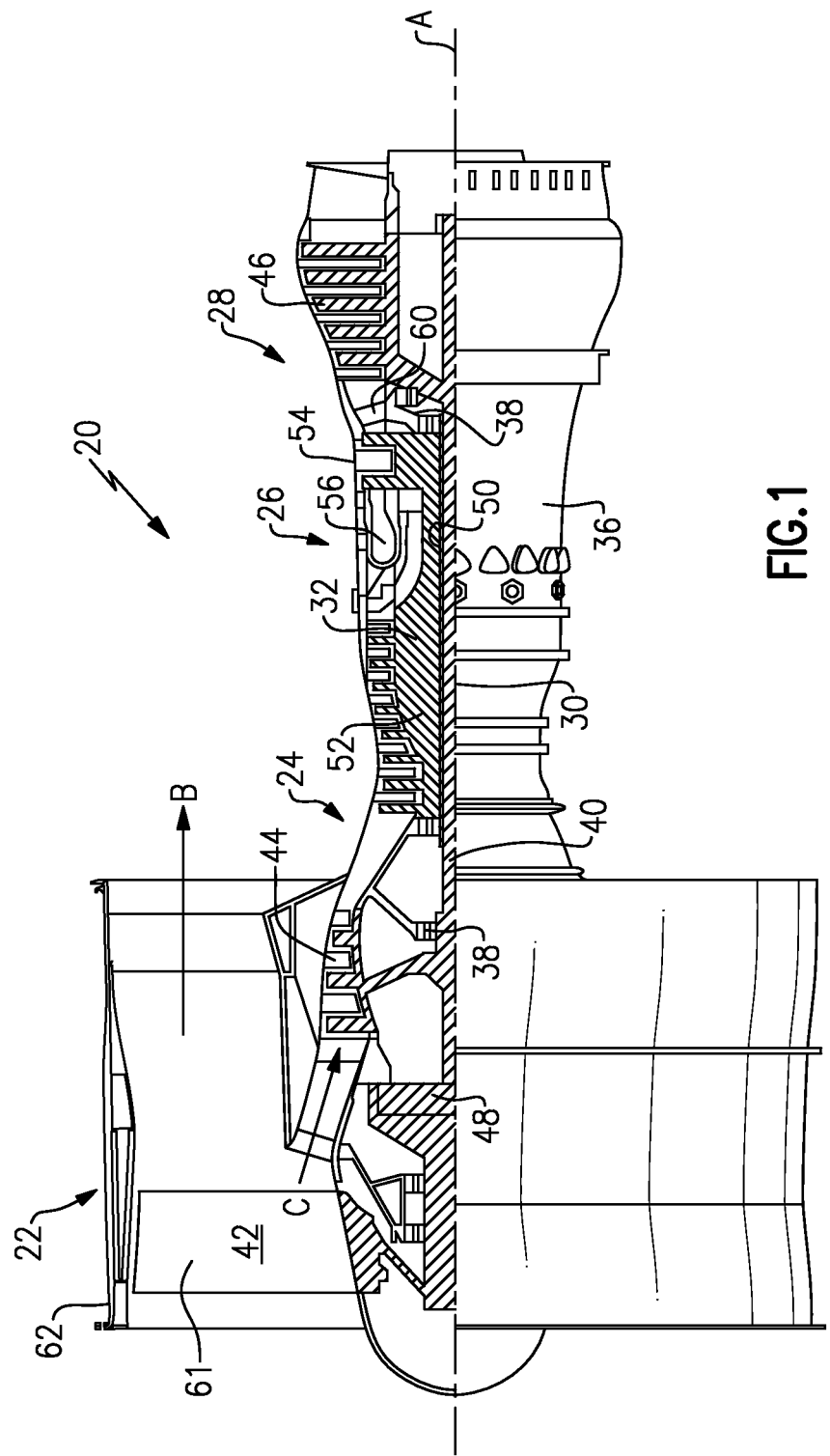
FIG. 1 illustrates a schematic view of an embodiment of a gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to the combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a geared turbofan gas turbine engine, it should be understood that the concepts described herein are not limited to use with geared turbofans as the teachings may be applied to other types of traditional turbine engines. For example, the gas turbine engine 20 can have a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The air in the core flow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core flow path C and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the air in the bypass flow path B because of the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 61 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 61 in the fan section 22 disclose an example gas turbine engine 20 with increased power transfer efficiency.

The fan section 22 includes a fan 42 including a plurality of fan blades 61 located radially about the axial centerline A. In one example, the fan blades 61 are made of an aluminum alloy.

Figure 2:
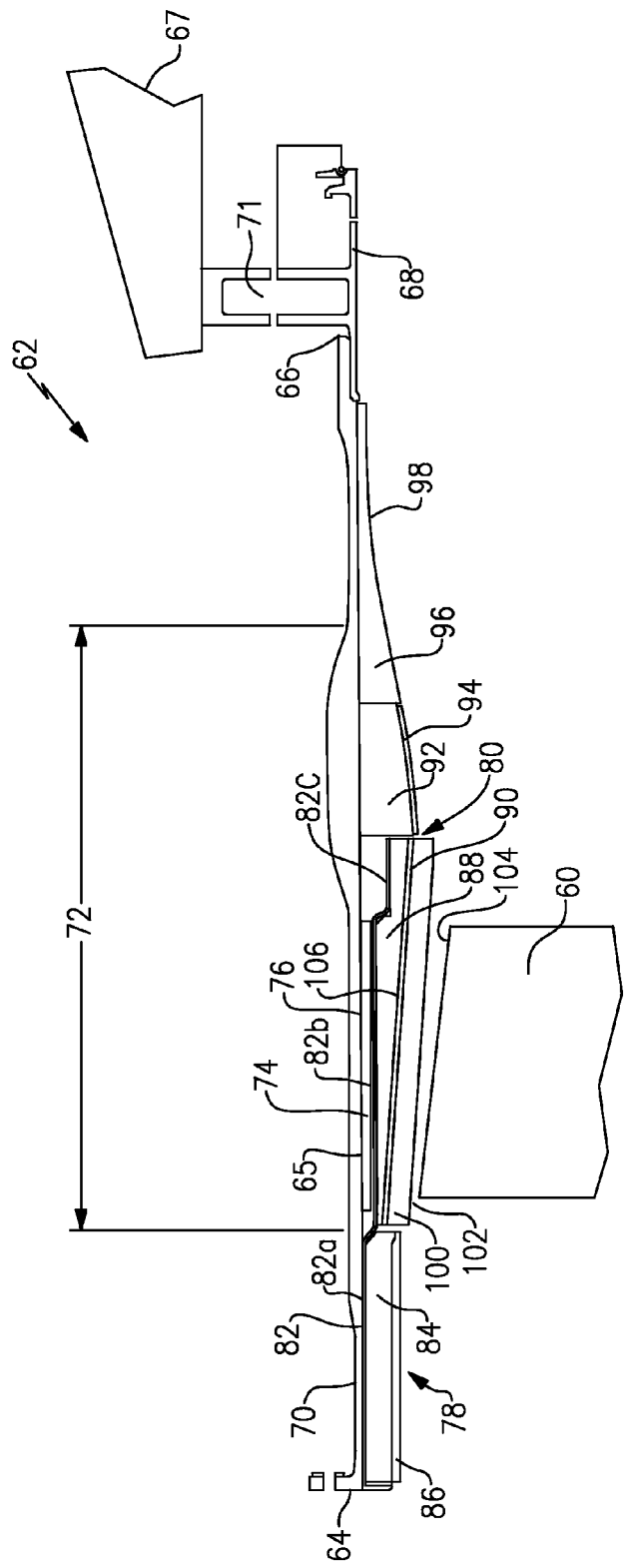
FIG. 2 illustrates a cross-sectional side view of a fan containment case.

The fan blades 61 are located within a fan containment case assembly 62. The fan containment case assembly 62 extends circumferentially around the axial centerline A to define a hoop. As shown in FIG. 2, the fan containment case assembly 62 includes a forward end region 64 and an aft end region 66.

The aft end region 66 of the fan containment case assembly 62 is secured to a front engine mount ring 68. The front engine mount ring 68 mounts the gas turbine engine 20 to a pylon 67 (shown schematically) employing engine mounts 71. In one embodiment, the front engine mount ring 68 is made of titanium.

The fan containment case assembly 62 includes an outer casing 70. The outer casing 70 is relatively stiff and provides a primary structural load path. In one example, the outer casing 70 is made of an aluminum alloy.

A fan blade containment region 72 of the fan containment case assembly 62 is located between the forward end region 64 and the aft end region 66. The fan blade containment region 72 generally circumferentially surrounds the fan blades 61.

A ballistic liner 74 is located in the fan blade containment region 72. The ballistic liner 74 is bonded to an inner surface 65 of the outer casing 70. In one example, the ballistic liner 74 is made of an aramid fiber fabric impregnated with epoxy resin. In one example, the ballistic liner 74 is made of Kevlar®, a registered trademark of E.I. du Pont de Nemours and Company of Wilmington, Del. The ballistic liner 74 protects the outer casing 70 from fan blade shear threat, and the outer casing 70 can be lighter and thinner because Kevlar® is better at blunting sharp loads than an aluminum alloy. An elastomeric material 76 bonds the ballistic liner 74 to the inner surface 65 of the outer casing 70.

A thermally conforming liner assembly 78 is located inwardly of the outer casing 70 and the ballistic liner 74. The thermally conforming liner assembly 78 extends from the forward end region 64 of the fan containment case assembly 62 to an area 80 located between the fan blade containment region 72 and the aft end region 66. The thermally conforming liner assembly 78 extends circumferentially around the axial centerline A.

The thermally conforming liner assembly 78 includes a circumferential liner 82 located inwardly of the outer casing 70 and the ballistic liner 74. In one example, the circumferential liner 82 is made of an aluminum alloy. The circumferential liner 82 extends from the forward end region 64 to the area 80. The circumferential liner 82 includes a first section 82a, a second section 82b, and a third section 82c. The first section 82a is located forward of the fan blade containment region 72, and the second section 82b and 82c are located in the fan blade containment region 72.

The thermally conforming liner assembly 78 includes a forward acoustic liner 84 located inwardly of and adjacent to the first section 82a of the circumferential liner 82. In one example, the forward acoustic liner 84 includes an aluminum alloy face sheet 86 that defines an outer gas flowpath of the fan 42. In one example, the forward acoustic liner 84 includes a honeycomb core radially outboard of the aluminum alloy face sheet 84.

The thermally conforming liner assembly 78 includes a honeycomb core 88 located inwardly of and adjacent to the second section 82b of the circumferential liner 82 in the fan blade containment region 72. In one example, the honeycomb core 88 is made of an aluminum alloy. In one example, the honeycomb core 88 has a wedge shape and its thickness increases from upstream to downstream. An inboard liner 90 is located inwardly of and adjacent to the honeycomb core 88. In one example, the inboard liner 90 is made of an aluminum alloy.

An abradable rub material 100 is located inwardly of the inboard liner 90. The abradable rub material 100 has a radially inboard surface 102 proximate to a tip 104 of the fan blades 61 and a radially outboard surface 106 that is adjacent to the inboard liner 90. The abradable rub material 100 is formed of a relatively compliant material. In one example, the abradable rub material 100 is aramid honeycomb filled with epoxy. If the tip 104 of one of fan blades 61 contacts the abradable rub material 100 during a blade out event, the abradable rub material 100 allows for a tighter clearance between the fan blades 61 and the fan containment case assembly 62. Additionally, the soft material of the abradable rub material 100 is damped, reducing modal response in the fan containment case assembly 62.

An ice impact liner 92 is located aft of and adjacent to the third section 82c of the circumferential liner 82. In one example, the ice impact liner 92 is made of an aluminum alloy. In one example, the ice impact liner 92 has a honeycomb core structure or includes a plurality of honeycomb cells. An impact resistant flowpath liner 94 is located inwardly of and adjacent to the ice impact liner 92. In one example, the impact resistant flowpath liner 94 is made of an aramid fiber composite.

An acoustic liner 96 is located downstream of the ice impact liner 92. In one example, the acoustic liner 96 is made of an aluminum alloy. In one example, the acoustic liner 96 has a honeycomb core structure or includes a plurality of honeycomb cells. A liner 98 is located inwardly of and adjacent to the acoustic liner 96. In one example, the liner 98 is made an aluminum alloy or an aramid fiber.

The coefficient of thermal expansion of the outer casing 70 of the aluminum alloy is different from the coefficient of thermal expansion of the ballistic liner 74 of the aramid fiber. An elastomeric material 76 bonds the ballistic liner 74 to the outer casing 70. In one example, the elastomeric material 76 is polysulfide or silicone rubber. The ballistic liner 72 is not bonded to the circumferential liner 82 of the thermally conforming liner assembly 78.

The elastomeric material 76 has a very high elongation and low stiffness and can stretch without generating high stresses. If the outer casing 70 expands and contracts, the elastomeric material 76 accommodates for these changes and prevents the ballistic liner 74 from debonding.

By employing a fan containment case assembly 62 and a circumferential liner 82 of an aluminum alloy, the circumferential liner 82 that defines the fan case flowpath and the tip 104 of the fan blades 61 can expand and contract together, optimizing tip clearance and improving fan 42 efficiency. By positioning the ballistic liner 74 between the outer case 70 and the thermally conforming liner assembly 78, the fan containment case assembly 62 can be thinner and have a reduced weight. The ballistic liner 74 protects the outer casing 70 from fan blade shear threat, while providing the fan efficiency of a fan containment case assembly 62 made entirely of an aluminum alloy. By employing a thermally conforming liner assembly 78, the fan containment case assembly 62 can expand and contract with the fan blade 61 of the same or similar material.

When assembling the fan containment case assembly 62, the elastomeric material 76 is applied as an elastomeric paste on an inner surface of the outer case 70. In one example, a pre-cured ballistic liner 74 is bonded to the outer case 70 with the elastomeric material 76. In another example, the ballistic liner 74 is co-cured while being bonded to the outer case 70 in an autoclave. The thermally conforming liner assembly 78 is then inserted through a front end of the fan containment case assembly 62 and attached together. In one example, the thermally conforming liner assembly 78 is secured to a front of the fan containment case assembly 62 with a plurality of fasteners, such as bolts.

Although a gas turbine engine 20 with geared architecture 48 is described, the fan containment case 22 can be employed in a gas turbine engine without geared architecture.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A fan section of a gas turbine engine comprising:
a fan containment case assembly including:
an outer case of an aluminum alloy, wherein the outer case extends circumferentially around an axial centerline;
a thermally conforming liner assembly located inwardly of the outer case, wherein the thermally conforming liner assembly includes a circumferential liner of an aluminum alloy, wherein the circumferential liner includes a first section located forward of a fan blade region and a second section located in the fan blade region, the thermally confirming liner assembly including a forward acoustic liner located inwardly of and adjacent to the first section of the circumferential liner and a honeycomb core located inwardly of and adjacent to the second setion of the circumferential liner; and
a ballistic liner located between the outer case and the thermally conforming liner assembly.

2. The fan section as recited in claim 1 wherein the ballistic liner is made of an aramid fiber.

3. The fan section as recited in claim 1 including a plurality of fan blades located radially about the axial centerline within the fan containment case assembly.

4. The fan section as recited in claim 3 wherein the ballistic liner circumferentially surrounds the plurality of fan blades and is located in fan blade region of the fan containment case assembly.

5. The fan section as recited in claim 3 wherein the circumferential liner includes a third section located aft of the fan blade region, and the thermally conforming liner assembly includes a face sheet located inwardly of the forward acoustic liner, and an inboard liner located inwardly of the honeycomb core.

6. The fan section as recited in claim 5 wherein the forward acoustic liner, the face sheet, the honeycomb core, and the inboard liner are made of an aluminum alloy.

7. The fan section as recited in claim 5 including an abradable rub material located inwardly of the second section of the circumferential liner in the fan blade region.

8. The fan section as recited in claim 7 wherein the abradable rub material is an aramid honeycomb filled with epoxy.

9. The fan section as recited in claim 1 wherein an elastomeric material bonds the ballistic liner to the outer case.

10. The fan section as recited in claim 9 wherein the elastomeric material is polysulfide or silicone rubber.

11. The fan casing as recited in claim 1 wherein the outer case is attached to the thermally conforming liner assembly with a plurality of fasteners.

12. The fan section as recited in claim 1 wherein the forward acoustic liner and the honeycomb core are both located inwardly of the outer case and adjacent to each other.

13. A gas turbine engine comprising:
a fan containment case assembly including an outer case of an aluminum alloy, wherein the outer case extends circumferentially around an axial centerline, a thermally conforming liner assembly located inwardly of the outer case, wherein the thermally conforming liner assembly includes a circumferential liner of an aluminum alloy, and a ballistic liner located between the outer case and the thermally conforming liner assembly, wherein the ballistic liner is made of an aramid fiber and is located in a fan blade region of the fan containment case assembly, wherein the circumferential liner includes a first section located forward of a fan blade region and a second section located in the fan blade region, the thermally conforming liner assembly including a forward acoustic liner located inwardly of and adjacent to the first section of the circumferential liner and a honeycomb core located inwardly of and adjacent to the second section of the circumferential liner; and
a plurality of fan blades located radially about the axial centerline within the fan containment case assembly, wherein the ballistic liner circumferentially surrounds the plurality of fan blades, the plurality of fan blades are located in the fan blade region of the fan containment case assembly.

14. The gas turbine engine as recited in claim 13 wherein the circumferential liner includes a third section located aft of the fan blade region, and the thermally conforming liner assembly includes a face sheet located inwardly of the forward acoustic liner, and an inboard liner located inwardly of the honeycomb core.

15. The gas turbine engine as recited in claim 14 wherein the forward acoustic liner, the face sheet, the honeycomb core, and the inboard liner are made of an aluminum alloy.

16. The gas turbine engine as recited in claim 14 including an abradable rub material located inwardly of the second section of the circumferential liner in the fan blade region.

17. The gas turbine engine as recited in claim 16 wherein the abradable rub material is an aramid honeycomb filled with epoxy.

18. The gas turbine engine as recited in claim 13 wherein an elastomeric material bonds the ballistic liner to the outer case.

19. The gas turbine engine as recited in claim 18 wherein the elastomeric material is polysulfide or silicone rubber.

20. The gas turbine engine as recited in claim 13 wherein the outer case is attached to the thermally conforming liner assembly with a plurality of fasteners.

* * * * *